(12) United States Patent
Frank et al.

(10) Patent No.: US 11,332,049 B2
(45) Date of Patent: May 17, 2022

(54) CHILD SAFETY SEAT WITH A TRIGGERABLE HARNESS BELT TENSIONING MECHANISM

(71) Applicant: Britax Römer Kindersicherheit GmbH, Leipheim (DE)

(72) Inventors: Richard Frank, Elchingen (DE); Janis Conrad, Gerstetten (DE)

(73) Assignee: Britax Romer Kindersicherheit GmbH, Leipheim (DE)

( * ) Notice: Subject to any disclaimer, the term of this patent is extended or adjusted under 35 U.S.C. 154(b) by 0 days.

(21) Appl. No.: 16/864,390

(22) Filed: May 1, 2020

(65) Prior Publication Data

US 2020/0346613 A1   Nov. 5, 2020

(30) Foreign Application Priority Data

May 2, 2019  (EP) ..................................... 19172419

(51) Int. Cl.
*B60N 2/28*  (2006.01)
*B60R 22/10*  (2006.01)
*B60R 22/44*  (2006.01)

(52) U.S. Cl.
CPC ......... *B60N 2/2812* (2013.01); *B60N 2/2803* (2013.01); *B60R 22/105* (2013.01); *B60R 22/44* (2013.01); *B60N 2002/2815* (2013.01); *B60N 2002/2818* (2013.01)

(58) Field of Classification Search
CPC ................ B60R 22/105; B60N 2/2812; B60N 2002/2815
See application file for complete search history.

(56) References Cited

U.S. PATENT DOCUMENTS

| 4,342,483 A * | 8/1982 | Takada ................. | B60N 2/2812 280/751 |
| 4,688,849 A * | 8/1987 | Tsuge .................... | B60N 2/2812 297/256.15 |
| 2007/0228787 A1* | 10/2007 | Nakhla ................. | B60N 2/2812 297/250.1 |

* cited by examiner

*Primary Examiner* — David R Dunn
*Assistant Examiner* — Tania Abraham
(74) *Attorney, Agent, or Firm* — K&L Gates LLP

(57) ABSTRACT

The invention relates to a child safety seat (100) comprising an integral harness belt (106) for restraining a child in the child safety seat (100), a deflector (102) for the harness belt (106), an elastic mechanism (104) adapted for forcing the deflector (102) from a first position (114) to a second position (112), the harness belt (106) being guided by the deflector (102), wherein due to the guidance by the deflector (102) the harness belt (106) length available for buckling in the child is shorter in the second position (112) than in the first position (114), a latch mechanism transferable between a blocking position and a release position, the latch mechanism being adapted for blocking in the blocking position the deflector (102) against a movement toward the second position (112) and for releasing in the release position the deflector (102) for a movement induced by the forcing toward the second position (112), a release mechanism adapted for transferring the latch mechanism from the blocking position to the release position upon receiving a trigger signal, and a force-transmitting element (116) coupled to a motion element (130), the force-transmitting element (116) being adapted for transmitting a motion force from the motion element (130) to the deflector (102) that acts to force the deflector (102) from the second position (112) to the first position (114).

16 Claims, 7 Drawing Sheets

CHILD SAFETY SEAT WITH A TRIGGERABLE HARNESS BELT TENSIONING MECHANISM

TECHNICAL FIELD

The present invention relates to child safety seats for use in passenger vehicles such as automobiles. Disclosed are a child safety seat, a method of operating a child safety seat and a computer program product for performing a method of operating a child safety seat.

BACKGROUND

Child safety seats can be placed on an installed seat of a passenger vehicle with or without a detachable connection to the vehicle frame, or they can be permanently installed in a vehicle. Passenger vehicles are usually also equipped with seat belts that can be used to secure a child safety seat and/or a child seated in the child safety seat to prevent injury during collisions or in other situations involving high acceleration/deceleration. Many vehicles also come with integrated anchoring structures to which a child safety seat can be attached; for example, according to the ISOFIX standard.

In many newer vehicles, seat belts are additionally equipped with pre-tension modules. Shortly before an impending crash or other high acceleration/deceleration, the pre-tensioner substantially increases the tension of the seat belt to facilitate an early coupling of the occupant to the vehicle frame undergoing sudden acceleration/deceleration. A pre-tensioner is usually triggered by a controller, such as an engine control unit (ECU), that receives signals from sensors in the body of the vehicle, and it may be configured to operate once in a crash situation by using explosively expanding gas to drive a piston that retracts the belt. Alternatively, pre-tensioners may use an electric drive or, more generally, an energy converter with a mechanical output that can operate repeatedly and for a sustained period to provide protection also in events other than collisions or pre-collisions.

There may be cases when a pre-tensioner may not effectively reduce a person's degree of freedom. A pre-tensioner installed in a vehicle acts only on the respective seat belt where the pre-tensioner is installed. However, many child safety seat models comprise a dedicated child restraint system, such as an integral harness belt. In this case, the seat belts of a vehicle may be used only as a fixture for the child safety seat. If a pre-tensioner is triggered to increase the belt tension of a vehicle seat belt securing a child safety seat, the dedicated seat belts of the child safety seat remain unaffected by this action. Hence, the pre-tensioning action may result in the tighter fixture of the child safety seat while the child's risk of inertial movement within any slack or clearance of the seat belt of the safety seat remains.

SUMMARY

The invention relates to a child safety seat. The child safety seat comprises an integral harness belt for restraining a child in the child safety seat, a deflector for the harness belt, an elastic mechanism adapted for forcing the deflector from a first position to a second position, the harness belt being guided by the deflector, wherein due to the guidance by the deflector the harness belt length available for buckling in the child is shorter in the second position than in the first position, a latch mechanism transferable between a blocking position and a release position, the latch mechanism being adapted for blocking (in the blocking position) the deflector against a movement toward the second position and for releasing (in the release position) the deflector for a movement induced by the forcing toward the second position, and a release mechanism adapted for transferring the latch mechanism from the blocking position to the release position upon receiving a trigger signal.

Embodiments may have the beneficial effect of providing a triggerable harness belt tensioning mechanism. The tensioning is achieved by forcing the deflector from the first position to the second position, in which the harness belt length available for buckling in the child is shortened. In other words, the length of the harness belt, which is available in the seating area of the child safety seat, may be shortened by retracting part of the harness belt into the child safety seat. The tensioning of the harness belt results in an improved securing of the child within the child safety seat. The child's room to move, i.e., its degree of freedom, within the seat may thus be reduced, resulting in a more compact fixation of the child within the child safety seat.

Because of the reduction of the child's room to move, the child's risk of inertial movement within any slack or clearance of the seat belt of the safety seat may effectively be avoided. High accelerations of the child relative to the child safety seat in the case of a sudden deceleration of a vehicle comprising the child safety seat may be prevented. Thus, the child's safety may be improved and risk of injury in the case of a car accident may be reduced.

The elastic mechanism may be configured to store elastic energy that may be released in the case of receiving the trigger signal to shorten the harness belt length available for buckling. Thus, the elastic mechanism in combination with the latch mechanism blocking the deflector in the first position may act as an integral pre-tension module comprised by the child safety seat. For example, the elastic mechanism may comprise a spring. The spring may be set under tension/pressure, moving the deflector from the second position to the first position, for example, the spring is attached to the deflector. The Tension/pressure of the spring may force the deflector from the first position back to the second position. In case of, for example, a sudden deceleration of a vehicle comprising the child safety seat, the trigger signal may be generated and received, triggering the respective pre-tension module to release the stored elastic energy in order to tension the harness belt. The trigger signal may, for example, be a pre-crash signal indicating a crash situation or high acceleration/deceleration.

By increasing the tension of the integral harness belt in response to the receipt of the triggering signal, the integral pre-tension module may tighten the integral harness belt, reducing any slack of the integral harness belt, and thus may provide an earlier coupling of the occupant, i.e., a child seated in the child safety seat, to the inertial frame of the accelerating/decelerating vehicle. In this way, the exposure of the child to peak forces may be reduced or minimized.

It has to be noted that generally the vehicle may be any vehicle that may carry the child safety seat, including cars, trucks, boats, trains or airplanes. With reference to a vehicle, the x-axis is the longitudinal axis of the vehicle, the y-axis is lateral to the x-axis and the z-axis is a vertical axis. Forward direction refers to the forward movement of the vehicle with the opposite being referred to as the reverse direction.

Likewise, the child safety seat is not restricted to any particular design. For instance, the child safety seat may be adapted for receiving a child in a sitting position, in a lying position (as may be the case with infant carriers or baby carriers) or in a transitional (tilted) position between sitting and lying. The child safety seat is also not restricted to fit the vehicle in any particular orientation, as may be the case with seats adapted for installation in the vehicle such that an occupant of the seat faces the forward or backward direction of the vehicle. Further, child safety seats that can be turned around a pivot point in between an entry position and a functioning position may be used. In the entry position, the seat may be oriented laterally such that an adult may easily position the child in the seat and then turn the seat toward the functioning position, in which the child faces in the forward or backward direction of the vehicle.

The child safety seat may be placed on and/or attached to a seat of the vehicle comprising anchorage points to which the child safety seat can be connected. For example, the child safety seat may comprise locking mechanisms that make use of or are based on the conventional ISOFIX locking mechanism (or ISOFIX attachments). ISOFIX attachments are adapted to engage with corresponding anchorage points that are arranged in a line behind the area of the inflection point in which the seat surface of the vehicle seat borders on the seat backrest of the vehicle seat on which the child safety seat is to be installed.

The release mechanism may be configured to react passively to the trigger signal. For example, the release mechanism may not comprise any processor, and the trigger signal may be a DC voltage level that is pre-set according to an "on/off" scheme, wherein the trigger signal directly triggers the release mechanism if it assumes the "on" level. For example, the release mechanism may be configured for releasing the latch mechanism using an electromagnetic drive being activated by receiving a voltage corresponding to the "on" level of the trigger signal. Alternatively, the child safety seat and/or the release mechanism may comprise an electronic control unit comprising a processor, a memory and a communication interface. The memory may comprise instructions, the execution of which by the processor may cause the release mechanism to transfer the latch mechanism into the release position in response to receiving the trigger signal by the communication interface. The communication interface may be in a communicative connection, for example, wired or wireless, with the release mechanism for transmitting the trigger signal to the release mechanism or indicating the receipt of the trigger signal to the release mechanism.

The trigger signal may be generated by dedicated hardware, for example, integrated with the vehicle, and may include a sensing unit such as a radar system. The dedicated hardware may be adapted for providing the trigger signal specifically to the child safety seat. The sensing unit may be configured for sensing an acceleration/deceleration. The trigger signal may be generated by existing hardware such as a collision avoidance system, trigger system, forward-collision warning system or collision mitigation system installed in the vehicle. The trigger signal may be dedicated specifically to triggering the release mechanism of the child safety seat.

In accordance with an embodiment, the trigger signal may be generated by a sensor unit comprised by the child safety seat. The sensing unit may, for example, be configured for sensing an acceleration/deceleration. In the case of an acceleration/deceleration exceeding a predefined threshold, the trigger signal may be generated in order to tension the harness belt.

In accordance with an embodiment, the latch mechanism comprises a first toothed element and a pawl. The deflector is coupled to the first toothed element. The latch mechanism is transferable between the blocking position and the release position by an engagement and a disengagement of the pawl with the first toothed element, respectively. For example, the first toothed element may be provided by a gear wheel or a gear rack.

Embodiments may have the beneficial effect of providing an efficient and effective method for blocking the latch mechanism in the blocking position. The pawl engaging the first toothed element of the latch mechanism may restrict the freedom of movement of the deflector coupled to the first toothed element from the first position to the second position. By disengaging the pawl from the first toothed element, the freedom of movement of the deflector coupled to the first toothed element may be re-established and the deflector may be forced by the elastic mechanism from the first position to the second position.

In accordance with an embodiment, the first toothed element and the pawl form a ratchet. A ratchet provides a mechanical device that allows continuous linear or rotary motion in one direction while preventing motion in an opposite direction. A ratchet may, for example, comprise a round gear wheel or a linear gear rack with the first toothed element comprising a plurality of teeth and the pawl engaging the teeth. The pawl may, for example, comprise a pivoting, spring-loaded finger element. The teeth of the first toothed element may be uniform but asymmetrical, with each tooth, for example, having a shallow slope on one edge and little or no slope on the opposite edge. When the teeth are moved in the unrestricted direction, the pawl may slide up and over the shallow sloped edges of the teeth. As the pawl passes the tip of each tooth, the spring may force the pawl into a depression between the tooth passed and a subsequent tooth. Upon an attempt to move the teeth in the opposite, i.e., restricted, direction, however, the pawl may catch against the opposite edge of the tooth passed, i.e., the next tooth in the restricted direction. Thereby, the pawl may lock against the respective tooth and prevent any further motion in the restricted direction.

In the blocking position, the pawl may prevent a motion of the first toothed element in such a manner that the deflector, connected to the first toothed element, can move from the first position to the second position.

Embodiments may have the beneficial effect of implementing an effective and efficient latch mechanism. In particular, a ratchet may allow movement of the deflector coupled to the first toothed element from the second to the first position in order to store elastic energy in the elastic mechanism without interference from the latch mechanism. The unrestricted direction of the ratchet may allow for such a movement from the second to the first position, while a movement in the opposite, restricted direction may be prevented. Thus, a movement of the deflector coupled to the first toothed element toward the second position may effectively be blocked by the pawl engaging the first toothed element.

In accordance with an embodiment, the engagement of the pawl with the first toothed element may be implemented by an elastic mechanism, for example, a spring, forcing the tip of the pawl toward the first toothed element, i.e., into recesses provided between the teeth of the first toothed element.

In accordance with an embodiment, the first toothed element comprises multiple teeth, and the pawl is adapted to engage with different teeth. Embodiments may have the beneficial effect that the different teeth may provide multiple blocking positions. Embodiments may have the beneficial effect that multiple teeth may provide multiple blocking positions defined by recesses between the teeth into which the tip of the pawl is forced in order to engage the first toothed element. Thus, a different amount may be defined by which the harness belt length available for buckling is shortened depending on the first position from which the deflector is moved to the second position. In other words, multiple first positions may be defined, differing by their respective distances to the second position. For example, the amount by which the harness belt length is shortened may be proportional to the distance between the first position and the second position. For example, the amount by which the harness belt length available for buckling is shortened may be identical to the distance between the first position and the second position.

In accordance with an embodiment, the release mechanism comprises a drive coupled to the latch mechanism. Embodiments may have the beneficial effect that the drive upon receiving the trigger signal may initiate and/or perform a transfer of the latch mechanism to which it is coupled from the blocking position to the release position.

The drive may, for example, comprise an electric drive, a mechanical spring under tension, a pressure reservoir such as a compressed-air cartridge, or a pyrotechnic module. An electric drive, i.e., an electric motor, converts electromagnetic forces, for example, an electric field, a magnetic field or both, to a linear or angular momentum.

The respective linear or angular momentum may drive the pawl. A pressure reservoir may, for example, comprise a mechanical spring or a gas under pressure, the pressure upon release driving the pawl. For example, the pressure reservoir may be provided by a gas spring. A pyrotechnic module may comprise a reservoir of a chemical that produces a quick exothermal reaction. The module may release gas in a controlled explosion, i.e., under high pressure and high temperature, into, for example, a solid tube. The linearly expanding gas then exerts momentum on a piston that drives the pawl.

In accordance with an embodiment, the drive is coupled to the pawl by a first coupling. Embodiments may have the beneficial effect that upon receipt of the trigger signal, the drive may initiate via the first coupling a movement of the pawl and/or move the pawl via the first coupling into a position at which the pawl disengages from the first toothed element, resulting in a release of the deflector. The released deflector may be forced by the elastic mechanism from the first position into the second position.

In accordance with an embodiment, the drive is adapted for rotating the pawl using the first coupling via a lever arm of the pawl around an axis between different rotational positions. The engagement and disengagement of the pawl with the first toothed element is caused by the different rotational positions of the pawl. Embodiments may have the beneficial effect of providing an efficient and effective mechanism for engaging and disengaging the pawl with the first toothed element, controlled by the drive.

In accordance with an embodiment, the child safety seat further comprises a force-transmitting element coupled to a motion element. The force-transmitting element is adapted for transmitting a motion force, forcing the deflector from the second position to the first position. Embodiments may have the beneficial effect of forcing the deflector from the second position to the first position, i.e., storing elastic energy in the elastic mechanism for a shortening of the harness belt length available for buckling in the case of the receipt of the trigger signal. The direction of force applied to the deflector by the force-transmitting element may be opposite to the direction of force applied onto the deflector by the elastic mechanism.

In accordance with an embodiment, the force-transmitting element comprises a pull cable. Embodiments may have the beneficial effect of providing a flexible and space-saving force-transmitting element. The pull cable may, for example, be implemented in the form of a Bowden cable, a flexible cable used to transmit mechanical force, for example, a pulling force, via the movement of an inner cable relative to a hollow outer cable housing. The outer cable housing may be of composite construction, comprising an inner lining, a longitudinally incompressible layer such as a helical winding or a sheaf of steel wire, and a protective outer covering. For example, a linear movement of the inner cable may be used to transmit a pulling force.

In accordance with an embodiment, the deflector is arranged on an arm rotatable about a first axis. The child safety seat further comprises a rolling element coupled to the force-transmitting element and is mounted eccentrically about a second axis. The rolling element is adapted to roll on the arm during a rotation of the rolling element about the second axis with the rotation being due to the motion force. The deflector is transferable from the second position to the first position due to the rolling.

Embodiments may have the beneficial effect of providing a mechanism for transferring the deflector from the second position to the first position, i.e., for storing elastic energy in the elastic mechanism, which is based on rotational movements of the elements involved, i.e., the rolling element and the force-transmitting element. A rotational movement may have the beneficial effect of requiring less space than a lateral movement, since the movement is executed on a circular curve rather than in a straight line. The motion force may, for example, be transmitted by the motion element onto the force-transmitting element, i.e., the motion element being adapted for transmitting the motion force onto the force transmitting element.

Since the rolling element is mounted eccentrically about the second axis, a mounting point at which the rolling element is mounted on the second axis is different from a geometric center, i.e., the centroid, of a cross section of the rolling element perpendicular to the respective second axis. The second axis may be parallel to the first axis such that the cross section also extends perpendicularly to the first axis. The second axis may be spaced apart from the first axis. The geometric center of the cross section may further be the geometric centre of the rolling element. The geometric centre may be spaced apart from the mounting point, with the rolling element being implemented in the form of an eccentric.

The rolling element may comprise a curved surface and/or a curved section of a surface, which rolls on the arm during the rotation of the rolling element about the second axis. The curvature of the curved surface and/or curved section may be convex. A radius of curvature of the convex curvature may originate in the second axis, i.e., the second axis may be the centre of an osculating circle coinciding with the convex curvature. The eccentric may, for example, have the form of a circular sector with a central angle of less than 180 degrees. The central angle may, for example, be in the range of 30 degrees to 120 degrees, such as 45 degrees to 60 degrees. The eccentric may, for example, be arcuate.

The arm may comprise a curved surface and/or a curved section of a surface, along which the rolling element rolls during the rotation about the second axis. The curvature of the curved surface and/or curved section may be convex or concave. The eccentric may, for example, be arcuate.

In accordance with an embodiment, the rolling element and the arm are shaped in such a manner that if the rolling element exceeds a predefined rotation orientation the arm is freely rotatable around the first axis for the transfer of the deflector from the first position to the second position.

Embodiments may have the beneficial effect that the rolling element automatically decouples from the arm upon reaching the predefined rotation orientation. The decoupled arm is freely rotatable around the first axis for the transfer of the deflector from the first position to the second position. Thus, rotating the rolling element beyond the predefined rotation orientation may establish the release position of the latch mechanism. In accordance with an embodiment, the rolling element is rotated into the predefined rotation orientation upon receipt of the trigger signal.

In accordance with an embodiment, the aforementioned rolling element decouples from the arm upon the deflector reaching the first position. The arm and thus the deflector may be held at by the latch mechanism at the position reached during decoupling.

In accordance with an embodiment, the deflector is transferable from the second position to the first position due to the rotation of the rolling element in a rotation direction from a starting rolling orientation to an end rolling orientation. The predefined rotation orientation results from a continuation of the rotational movement in the direction of movement beyond the end rolling orientation.

In accordance with an embodiment, the child safety seat further comprises a decoupling mechanism adapted for automatically decoupling the force-transmitting element from the motion element upon the deflector having reached the first position.

Embodiments may have the beneficial effect that decoupling the force-transmitting element from the motion element may ensure that the motion element will not block movement of the deflector from the first to the second position via the force-transmitting element. In other words, the motion element may be prevented from exerting a force onto the deflector via the force-transmitting element.

In accordance with an embodiment, the decoupling mechanism is further adapted for automatically recoupling the force-transmitting element to the motion element upon the deflector having reached the second position. Embodiments may have the beneficial effect of enabling, by the recoupling, the motion element to move the deflector back to the first position upon reaching the second position.

In accordance with an embodiment, the motion element is a movable lever arranged outside a seat shell of the child safety seat. Embodiments may have the beneficial effect of providing efficient and effective implementation of a motion element for moving the deflector from the second position to the first position using a force-transmitting element.

The child safety seat may, for example, further comprise a rebound bar. The rebound bar is adapted for being fixed rigidly to the seat and for forming an abutment with respect to the vehicle seat on which the child safety seat is to be installed. In accordance with this embodiment, the lever may be given by the rebound bar. For example, positioning the rebound bar in a position in which it is intended to be fixed rigidly may comprise a rotation about an axis. Thus, the rebound bar may provide a lever being rotated around the respective axis.

A rebound bar may be arranged at the supporting base, the foot end or the head end of the seat, and may comprise a locking mechanism and a release button. Generally, "rebound" is understood as the movement that occurs in response to the initial action of a crash. In the event of a crash, there are always two forces, the initial crash force and the subsequent rebound, impacting the occupant. The rebound bar typically rests against the backrest of the vehicle seat when the child safety seat is installed on the vehicle seat. By means of the rebound bar, the rebound movement of the child safety seat may be reduced in the event of a crash. Another benefit of the rebound bar may be that in the case of rear impact to the vehicle in which the child safety system is installed, the rotation of the child safety seat to the rear direction is also controlled.

In one example, the rebound bar is arranged on the child safety seat so as to be rotatable about an axis and is releasably fixable in a plurality of positions, wherein the lever mechanism is operable due to the rotation. The elastic element may then be loaded by pressing the rebound bar of the child safety seat against the backrest of the vehicle seat.

In accordance with an embodiment, the motion element is a portion of the harness belt. Embodiments may have the beneficial effect that via the harness belt, the deflector may be movable from the second to the first position. For example, the movement of the deflector from the second to the first position may be part of a buckling operation when buckling a child into the child safety seat. In accordance with an embodiment, the motion element is a drive shaft of a motor. The motor may be, for example, an electric motor. The drive shaft may generate a motion force, which is transmitted via the force-transmitting element.

In accordance with an embodiment, the child safety seat further comprises a supporting base and a seat element, which provides seating for the child in the seat. The seat element is mounted rotatably relative to the supporting base, and the motion force results from the rotation of the seat element relative to the supporting base. Embodiments may have the beneficial effect of providing an easier handling of the child safety seat, in particular to facilitate the buckling of the child into the safety seat. Furthermore, by rotating the seat element, a child buckled into the seat element may be adjusted in an orientation that increases child protection. For example, the child may be positioned in an orientation facing contrary to the direction of movement of the vehicle in which the child safety seat is mounted. Thus, in the case of a sudden deceleration, the child may be pressed into the seat element rather than being pressed in a direction out of the seat element.

Rotation of the seat element relative to the supporting base may be horizontal, i.e., about an axis parallel to the z axis, or vertical, for example, about an axis parallel to the y axis. Using the motion force that results from the rotation of the seat element to transfer the deflector into the first position may lower the risk of forgetting the transfer, because it can be assumed that the seat element is regularly rotated into a position suitable for driving before driving the vehicle starts to move.

In accordance with an embodiment, the seat element is horizontally rotatable, i.e., about the z axis of the vehicle, between an entry position and a driving position. The entry position and the driving position differ by at least an angle of rotation of 45 degrees and preferably at least 80 degrees. The motion force results from the rotation of the seat element relative to the supporting base between the entry position and the driving position. The entry position may facilitate positioning a child in the seat from a side of the seat. With the seat element in the driving position, the child is aligned with the positive or negative forward direction of the seat. Thus, embodiments may have the beneficial effect of facilitating the buckling of the child in the entry position, while the security of the child while the vehicle is moving may be increased in the driving position. In the driving position, the child may, for example, face in a direction opposite to the direction of movement of the vehicle in which the child safety seat is mounted. For example, the entry position and the driving position may differ by an angle of rotation of 90 degrees. In accordance with an embodiment, a movement of the deflector from the second position to the first position may result from a full movement of the seat element between entry and driving position.

In accordance with an embodiment, the decoupling mechanism is adapted for performing the force decoupling of the force-transmitting element from the motion element upon the seat element having reached the driving position. Embodiments may have the beneficial effect that the force-transmitting element being decoupled from the motion element upon reaching the driving position ensures that the deflector is prepared for being forced from the first to the second position upon release of the latch mechanism due to receipt of the trigger signal. Furthermore, maintaining the coupling between the motion element and the force-transmitting element during the transition from the entry position to the traveling position may provide additional security and prevent any accidental shortening of the belt length for buckling in the child, particularly during buckling in the entry position.

In accordance with an embodiment, the motion element is arranged at a rigid position on the supporting base. Embodiments may have the beneficial effect that due to the rigid position of the motion element, any rotational change of relative position/orientation between the seat element and the supporting base may result in a motion force by the motion element onto the force-transmitting element. The motion element adapted for transmitting the motion force onto the force-transmitting element may, for example, comprise an attachment element rigidly attached to the supporting base. For example, the force-transmitting element comprises a pull cable with a first end being connected to the attachment element. The rotation of the seat element relative to the supporting basis may result in a tensioning of the pull cable. For example, a distance between a section of the seat element comprising the deflector and the attachment element rigidly connected with the supporting base may increase because of the relative rotation.

In accordance with an embodiment, the force-transmitting element comprises a transmission shaft. In accordance with an embodiment, the supporting base comprises the motion element. Embodiments may have the beneficial effect of providing an efficient and effective mechanism for implementing the force-transmitting element. For example, the motion element may comprise a gear wheel causing a rotation of the transmission shaft comprised by the seat element upon a rotation of the seat element relative to the supporting element.

In accordance with an embodiment, the force-transmitting element comprises a second toothed element. The motion element comprises a gear wheel adapted for meshing with the second toothed element and for transmitting a torque resulting from the rotation of the seat element to the second toothed element.

Embodiments may have the beneficial effect that the force exerted by the motion element via the force-transmitting element may be provided in the form of the torque resulting from the rotation of the seat element relative to the supporting base. Thus, the motion element is not required to comprise any source of energy on its own. The energy originating from the motion element and being transferred via the force-transmitting element on the first toothed element and the deflector to the elastic mechanism may instead result from the rotation of the seat element.

The second toothed element may, for example, be provided by a gear wheel or by a gear rack. In accordance with an embodiment, the gear wheel providing the second toothed element has a smaller diameter than the gear wheel comprised by the motion element.

In accordance with an embodiment, the motion element may be provided in the form of a second toothed element arranged at a rigid position on the supporting base and meshing with a gear wheel comprised by the seat element, such that a rotation of the seat element relative to the supporting base may result in a rotation of the gear wheel relative to the seat element. Alternatively, the motion element may be provided in the form of a gear wheel rigidly fixed to the seat element and arranged for moving a second toothed element comprised by the supporting base upon a rotation of the seat element relative to the supporting element.

In accordance with an embodiment, the decoupling mechanism is adapted for performing the force decoupling by disengaging the second toothed element from the gear wheel. Embodiments may have the beneficial effect of providing an effective and efficient mechanism for implementing the force decoupling by disengaging upon the seat element reaching the driving position.

In accordance with an embodiment, the decoupling mechanism comprises for performing the force decoupling an electromechanical actuator. The electromechanical actuator may be configured to receive a control signal upon the seat element reaching the driving position. The control signal may control the electromechanical actuator to execute the force decoupling. The electromechanicalactuator may comprise an electric drive, also referred to as an electric motor, that converts electromagnetic forces, for example, an electric field, a magnetic field or both, to a linear or angular momentum.

The seat element reaching its driving position may be detected using a sensor element, for example, a microswitch. The sensor may, for example, comprise a push-button switch or an optical switch. Upon the seat element reaching the driving position, the sensor element may send a signal indicating the driving position being reached to the electromechanical actuator and/or a control unit controlling the electromechanical actuator.

In accordance with an embodiment, the decoupling mechanism comprises for performing the force decoupling a mechanical forced guidance coupled to the rotation of the seat element. The forced guidance may, for example, comprise a pull cable. The tension of the pull cable may increase due to the rotation, resulting in the force decoupling upon reaching the driving position by the seat element.

In accordance with an embodiment, the decoupling mechanism further comprises a control unit. The control unit is adapted for controlling the electromechanical actuator for engaging the second toothed element with the gear wheel in response to the deflector having taken the second position.

Embodiments may provide an efficient and effective way of controlling the engaging of the second toothed element with the gear wheel, i.e., the re-establishment of the force-coupling between the force-transmitting element and the motion element. In accordance with an embodiment, the re-establishing of the force-coupling requires the deflector having been taken to the second position. In case of the deflector still remaining in the first position, no force-coupling is established in order to prevent any further force transmission from the motion element via the force-transmitting element onto the deflector. The reaching of the second position may be detected by using a suitable sensor element, for example, a push-button switch, an optical sensor or a tension sensor monitoring the tension of the elastic element forcing the deflector from the first to the second position.

In accordance with an embodiment, the child safety seat is an infant carrier.

In another aspect, the invention relates to a method of operating a child safety seat. The child safety seat comprises an integral harness belt for restraining a child in the child safety seat, a deflector for the harness belt, an elastic mechanism adapted for forcing the deflector from a first position to a second position, the harness belt being guided by the deflector, wherein due to the guidance by the deflector the harness belt length available for buckling in the child is shorter in the second position than in the first position, a latch mechanism transferable between a blocking position and a release position, the latch mechanism being adapted for blocking (in the blocking position) the deflector against a movement toward the second position and for releasing (in the release position) the deflector for a movement induced by the forcing toward the second position, and a release mechanism adapted for transferring the latch mechanism from the blocking position to the release position upon receiving a trigger signal.

The method comprises receiving the trigger signal and transferring the latch mechanism to the release position. The method may further be configured for operating any embodiments of the child safety seat disclosed herein.

In another aspect, the invention relates to a computer program product. The computer program product comprises computer-executable instructions to perform the method according to any embodiment disclosed herein.

The above-described examples and embodiments as well as any features shown in the figures and described below may be combined freely as long as the individual examples and embodiments are not mutually exclusive.

BRIEF DESCRIPTION OF DRAWINGS

In the following, embodiments of the invention are described in greater detail, in which.

In the following, similar elements are denoted by the same reference numerals.

DESCRIPTION OF EMBODIMENTS

Figure 1:
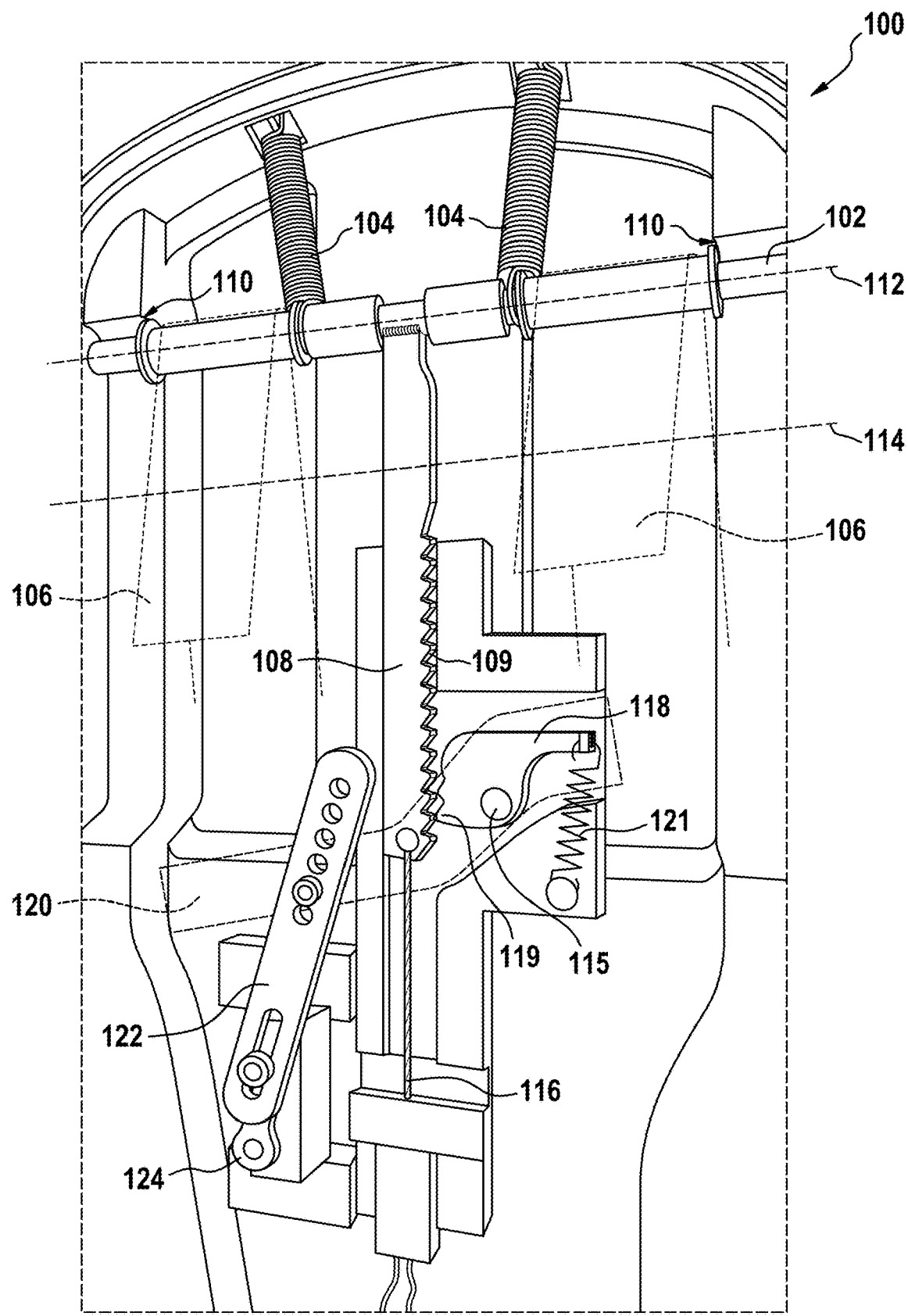
FIG. 1 shows a first exemplary triggerable harness belt tensioning mechanism.

FIG. 1 shows a schematic drawing of a triggerable harness belt tensioning mechanism comprised by a child safety seat 100. The mechanism shown in FIG. 1 may, for example, be comprised by a backrest of a seat element of the child safety seat 100. The child safety seat 100 comprises a deflector 102. The deflector 102 is coupled to an elastic mechanism 104. The deflector 102 depicted has the form of a bar. However, the deflector 102 may have any geometrical form suitable to connect the same, for example, permanently, with a harness belt 106 as well as a latch mechanism. In case of FIG. 1, the latch mechanism comprises a first toothed element 108 connected with the deflector 102. The elastic mechanism 104 may be implemented in the form of any elastic mechanism suitable for storing elastic energy in order to force the deflector 102 from a first position into a second position within milliseconds by releasing the stored energy. The depicted elastic mechanism 104 comprises two springs that are each connected with the deflector 102 as well as a frame of the child safety seat 100. The deflector 102 is depicted in the second position 112, indicated by a dashed line at which the springs of the elastic mechanism 104 are relaxed, i.e., store none or only a minimum amount of elastic energy. A movement of the deflector 102 beyond the second position 112 toward the elastic mechanism 104 is blocked by motion-limiting stop elements 110. When the deflector 102 is moved downward in a direction toward the first toothed element 108, the springs comprised by the elastic mechanism 104 are extended and elastic energy is stored within the same. When the deflector 102 reaches an end position, i.e., first position indicated by dashed line 114, the elastic mechanism 104 exerts a force onto the deflector 102, forcing the deflector 102 from the first position 114 toward the second position 112. By moving the deflector 102 from the first position 114 to the second position 112, the harness belt 106 is pulled into the seat element of the child safety seat 110, shortening the harness belt length available for buckling a child into a seating area of the seat element.

The deflector 102 may be moved from the second position 112 to the first position 114 by a force-transmitting element, for example, a pull cable 116 pulling the first toothed element 108 in a direction away from the elastic mechanism 104. The motion of the pull cable 116 may be caused by a motion element (not shown) pulling at the pull cable 116. The first toothed element 108 may be part of a ratchet further comprising a pawl 118. The first toothed element 108 may comprise a plurality of teeth 109. The pawl 118 may comprise a tip 119, which is forced by a further elastic mechanism 121 toward the first toothed element 108 and, in particular, into recesses provided between the plurality of teeth 109 of the first toothed element 108. The pawl 118 engaging the first toothed element 108may ensure that a movement of the first toothed element 108 toward the elastic mechanism 104 is restricted. Thus, a blocking position of the latch mechanism provided by the fist toothed element 108 and the pawl 118 may be established. The blocking position blocks the deflector 102 against a movement from the first position 114 toward the second position 112. On the other hand, the ratchet comprising the first toothed element 108 and the pawl 118 may allow for unrestricted movement of the deflector 102 from the second position 112 into the first position 114. The latch mechanism comprising the ratchet with the first toothed element 108 and the pawl 118 may be transferred from the blocking position into a release position by disengaging the tip 119 of pawl 118 from the teeth 109 of the fist toothed element 108. The release mechanism for transferring the latch mechanism from the blocking position to the release position may comprise a drive 124, which is coupled to a lever arm 120 of the pawl 118 via a coupling 122. The coupling 122 may, for example, be provided by any type of rigid or flexible connecting element suitable for exerting a force on the lever arm 120, forcing the pawl 118 to disengage from the teeth 109 of the fist toothed element 108. Exerting a force on the lever arm 120 may result in a rotation of the pawl 118 around an axis 115 between different rotational positions. The different rotational positions of the pawl 118 may establish engagement and disengagement of the pawl 118 with the first toothed element 108. In FIG. 1, the drive 124 may exert a force on the coupling 122, which is transferred via the lever arm onto the pawl 118, forcing the pawl 118 to disengage from the teeth 109 of the first toothed element 108. Upon receipt of a trigger signal, the drive 124 may be controlled to apply the force via the coupling 122 and the lever arm 120 onto the pawl 118, resulting in a disengagement of the same from the teeth 109 of the first toothed element 108. Thus, the force exerted by the elastic mechanism 104 on the deflector 102 is no longer counterbalanced by the latch mechanism, and the deflector 102 is forced from the first position 114 into the second position 112, thereby releasing the elastic energy stored in the elastic mechanism 104. While moving from the first position 114 to the second position 112, deflector 102 pulls the harness belt 106 into the seat element of the child safety seat 100. Pulling in the harness belt 106 shortens the harness belt length available for buckling a child into the child safety seat 100. Thus, the child's room to move may be restricted, providing a protection of the child against accelerations relative to the child safety seat 100.

Figure 2:
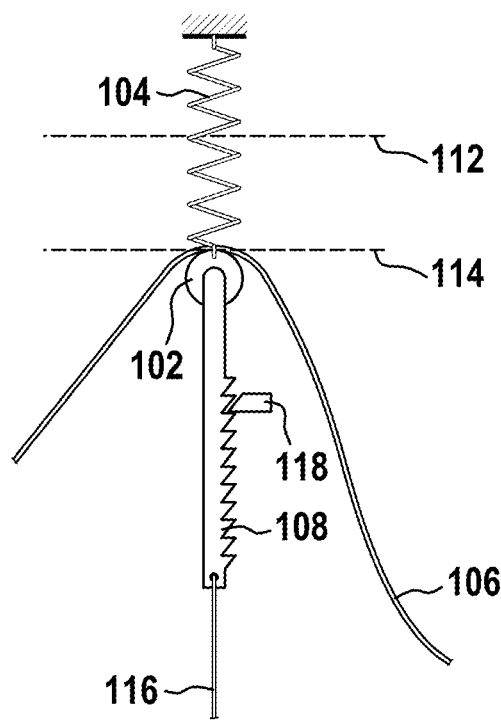
FIG. 2 shows the first exemplary triggerable harness belt tensioning mechanism.

FIG. 2 shows a second schematic drawing of the principles of the mechanism illustrated in FIG. 1. The deflector 102 is positioned in the first position 114. The elastic mechanism 104, for example, comprising a spring under tension, exerts a force onto the deflector 102, forcing the deflector 102 toward the second position 112. Any movement of the deflector 102 toward the second position 112 is blocked by the latch mechanism in the blocking position. The latch mechanism may comprise the first toothed element 108, for example, a gear rack, and the pawl 118. In the blocking position, the pawl 118 is engaged with the first toothed element 108. Upon receipt of a trigger signal, pawl 118 is disengaged from first toothed element 108, transferring the latch mechanism from the blocking position into a release position in which the deflector 102 is released for a movement induced by the elastic mechanism 104, forcing the deflector 102 toward the second position 112. The harness belt 106 is positioned over the deflector 102, and both ends of the harness belt may be fixed. Upon a movement of the deflector 102 from the first position 114 toward the second position 112, a pulling force is applied to the harness belt 106, resulting in a shortened harness belt length available for buckling a child into the child safety seat 100. In order to transfer the deflector 102 from the second position 112 to the first position 114, the force-transmitting element 116, for example, a pulling cable, connected to the first toothed element 108 may be used. A pulling force may be applied to the pulling cable 116 by a motion element (not shown).

Figure 3:
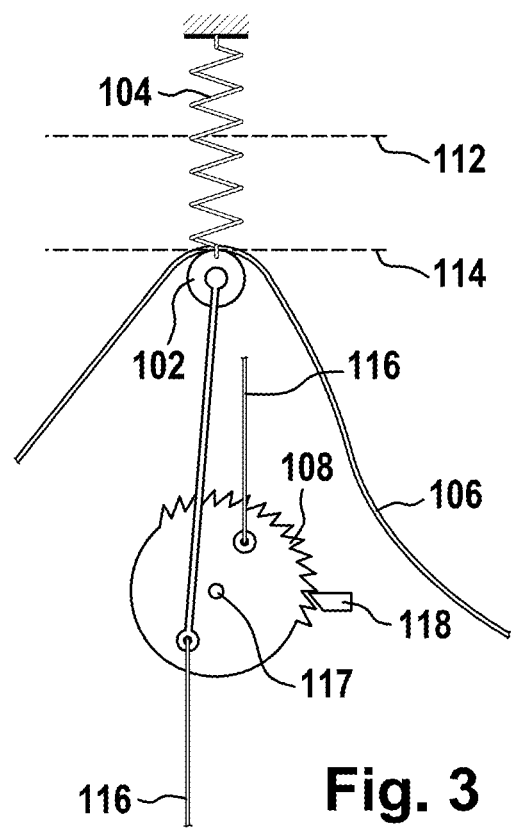
FIG. 3 shows a second exemplary triggerable harness belt tensioning mechanism.

FIG. 3 shows a schematic drawing of an alternative implementation of the latch mechanism compared with the latch mechanism of FIG. 2. In the case of FIG. 3, the first toothed element 108 is provided in the form of a gear wheel instead of the gear rack shown in FIG. 2. The gear wheel 108 may be rotated using one or two force-transmitting elements 116 connected with the gear wheel 108 eccentrically from a rotation axis 117 of the gear wheel 108. By applying a force via the force-transmitting elements 116 onto the gear wheel 108, the gear wheel 108 may be rotated, for example, counter-clockwise, from an initial orientation to a final orientation, resulting in a movement of the deflector 102 from the second position 112 to the first position 114.

Upon disengaging the pawl 118 from the gear wheel 108, the deflector 102 is forced back toward the second position 112 by the elastic mechanism 104, and the gear wheel 108 is rotated clockwise back from the final orientation to the initial orientation.

Figure 4:
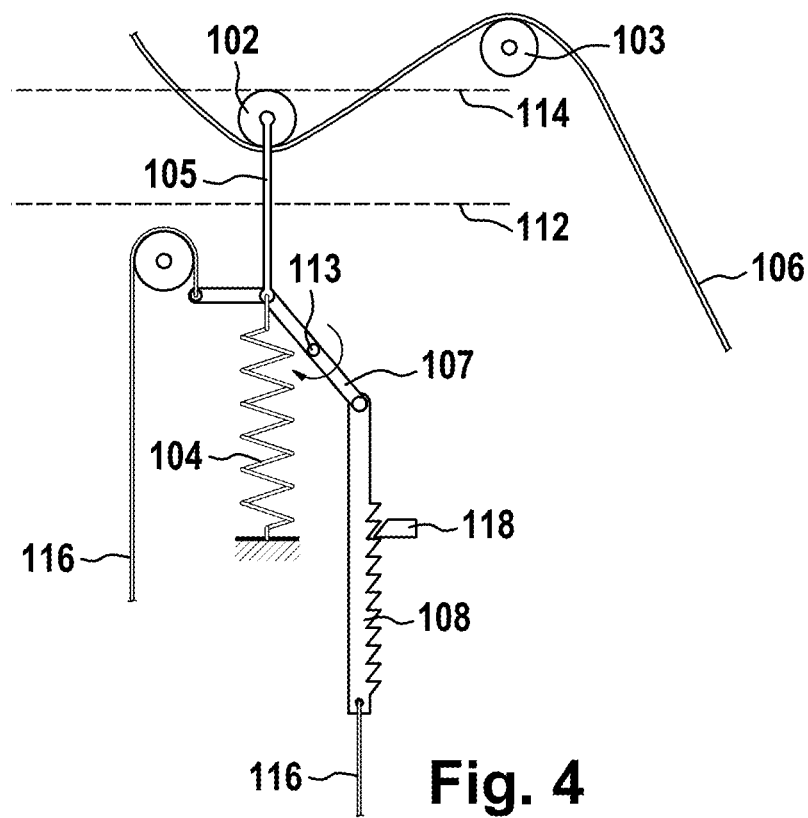
FIG. 4 shows a third exemplary triggerable harness belt tensioning mechanism.

FIG. 4 shows a schematic drawing of a further implementation of the harness belt tensioning mechanism. In FIG. 4, an additional deflector 103 is implemented at a fixed position. The harness belt 106 is led underneath the deflector 102. The second position 112 is located beneath the first position 114. The elastic mechanism 104 and the first toothed element 108, for example, a gear rack, are coupled with the deflector 102 via the same coupling element 105. Thus, any force applied by the elastic mechanism 104 and the first toothed element 108 onto the deflector 102 exerts at the same point of the deflector 102, while in the case of the embodiments of FIGS. 2 and 3, the forces exert at the opposite position of the deflector 102. In order to enable applying forces in different directions on the deflector 102, the force applied via the first toothed element 108 is directionally reversed using a rotation element 107 rotating around a rotational axis 113. In order to move the deflector 102 from the second position 112 to the first position 114, a pulling force may be applied via a force-transmitting element 116 onto the first toothed element 108, which is transformed by the rotational element 107 into a pushing force, pushing the deflector from the second position 112 to the first position 114. The movement of the deflector 102 from the second position 112 to the first position 114 may further be supported by a second force-transmitting element 116 pulling at the rotational element 107, which transforms the pulling force into a pushing force. Upon disengaging the pawl 118 from the first toothed element 108, the rotational element 107 is free to rotate around the rotational axis 113. Thus, the elastic energy stored in the elastic mechanism 104 may be discharged, forcing the deflector 102 from the first position 114 to the second position 112. In other words, the deflector 102 is pulled, for example, by a contracting spring comprised by the elastic mechanism 104, from the first position 114 into the second position 112.

Figure 5:
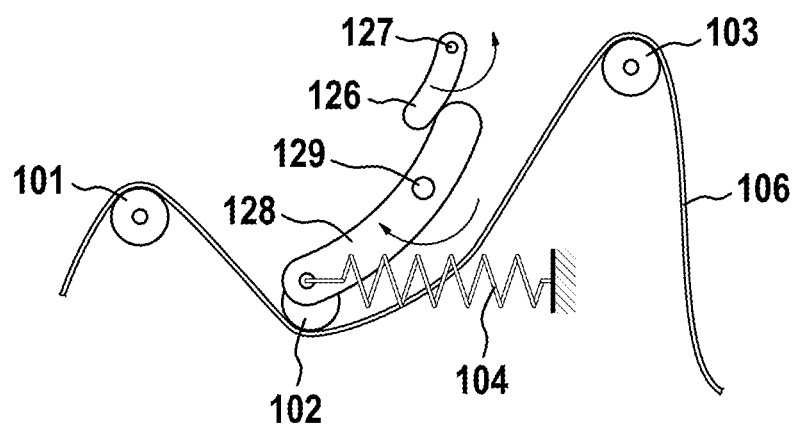
FIG. 5 shows a fourth exemplary triggerable harness belt tensioning mechanism.

FIG. 5 shows a schematic drawing of a further alternative embodiment of the harness belt tensioning mechanism. The harness belt 106 may be led over additional deflector elements 101, 103 and below the deflector 102 positioned between the additional two deflectors 101, 103. The additional deflector elements 101, 103 may be located at fixed positions. The force-transmitting element (not shown) may be coupled to a rolling element 126. The force-transmitting element may be configured to transmit a rotational force onto the rolling element 126 rotating about rotational axis 127. For example, the force-transmitting element may comprise a transmission shaft coupled to a gear wheel attached to the rolling element 126 and rotating around the same rotational axis 127 as rolling element 126. Rolling element 126 may be mounted eccentrically about the rotational axis 127. The deflector 102 is arranged on an arm 128 rotatable about a rotational axis 129. The arm 128 may be mounted eccentrically or concentrically about rotational axis 129.

If the rolling element 126 is rotated counter-clockwise around rotational axis 127, the rolling element 126 rolls on the arm 128, causing a clockwise rotation of the arm 102 and the deflector 102 around rotational axis 129. The resulting clockwise rotation of the deflector 102 around the rotational axis 129 reduces the tension on the harness belt 106. In other words, the amount of harness belt length available for buckling a child into the child safety seat 100 is increased and the deflector 102 is moved into a first position 114. Upon reaching the end of arm 128, the rolling element 126 disengages from the arm 128, i.e., it decouples from the same, resulting in the arm 128 being freely rotatable around rotational axis 129. In accordance with an embodiment, the release mechanism for transferring the latch mechanism from a blocking position, i.e., a position at which the rolling element 126 is engaged with the arm 128, to a release position, in which the rolling element 126 is disengaged from the arm 128, may be implemented by the rolling element 126. By rotating the arm 128 and the adaptor 102 clockwise around rotational axis 129, elastic energy may be stored in the elastic mechanism 104. Upon disengagement of the rolling element 126 from the arm 128, the elastic energy stored in the elastic mechanism 104 may be released, forcing the adaptor 102 from the first position 114 into the second position 112, thereby tensioning the harness belt 106. According to an alternative embodiment, a latch mechanism independent of the rolling element 126 may be implemented. In this case, the rolling element 126 is configured only to transfer the deflector 102 from the second position into the first position. Upon reaching the first position 114, i.e., upon the rolling element 126 reaching the end of the arm 128, the rolling element 126 decouples from the arm 128. Thus, the arm 128 and the deflector 102 are enabled to rotate freely about the rotational axis 129, if the release mechanism transfers the additional latch mechanism (not shown) from a blocking position to a release position.

Figure 6:
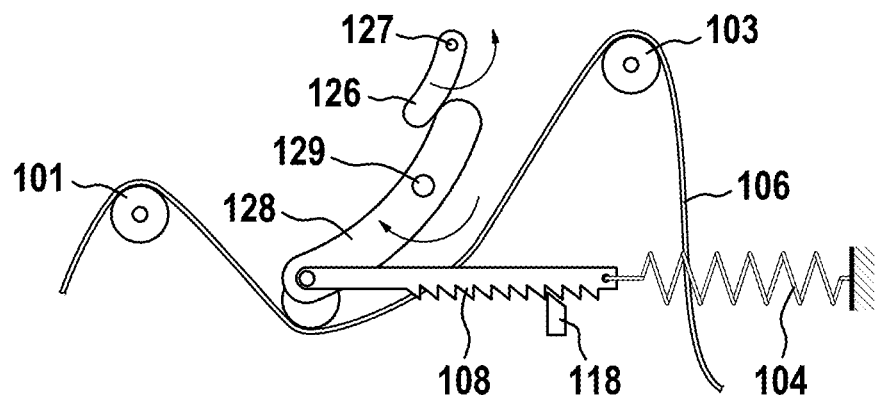
FIG. 6 shows a fifth exemplary triggerable harness belt tensioning mechanism.

FIG. 6 shows a schematic drawing of the mechanism of FIG. 5 supplemented by a latch mechanism independent of the rolling element 126. In FIG. 6, the elastic mechanism 104 is coupled to the deflector 102 and/or the arm 128 via a latch mechanism comprising a first toothed element 108, for example, a gear rack, and a pawl 118. The first toothed element 108 and pawl 118 may form a ratchet, which allows a clockwise rotation of arm 128 around axis 129 while blocking a counter-clockwise rotation as long as the pawl 118 is engaged with the first toothed element 108, establishing a blocking position of the release mechanism. Upon receipt of a trigger signal, pawl 118 is disengaged from the first toothed element 108 via a release mechanism (not shown), allowing the arm 128 and the deflector 102 to freely rotate around rotational axis 129 and forcing them from the first position 114 into the second position 112 by the elastic mechanism 104. In accordance with an embodiment, the rolling element 126 may be supplemented or replaced by a force-transmitting element directly coupled to the arm 128.

Figure 7:
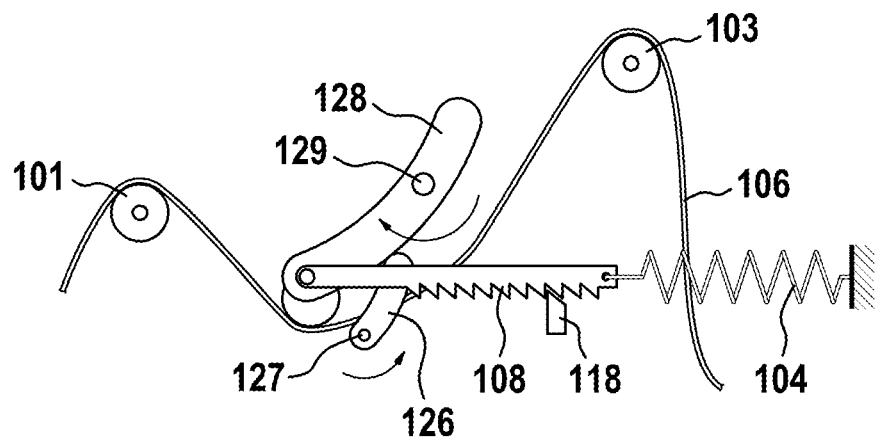
FIG. 7 shows a sixth exemplary triggerable harness belt tensioning mechanism.

FIG. 7 shows a schematic drawing of a further alternative embodiment of the setup of FIG. 6. In the case of FIG. 7, the rolling element is located at the same end of the arm 128 as the deflector 102 instead of being located at the opposite end, as shown in FIG. 5 and FIG. 6.

Figure 8:
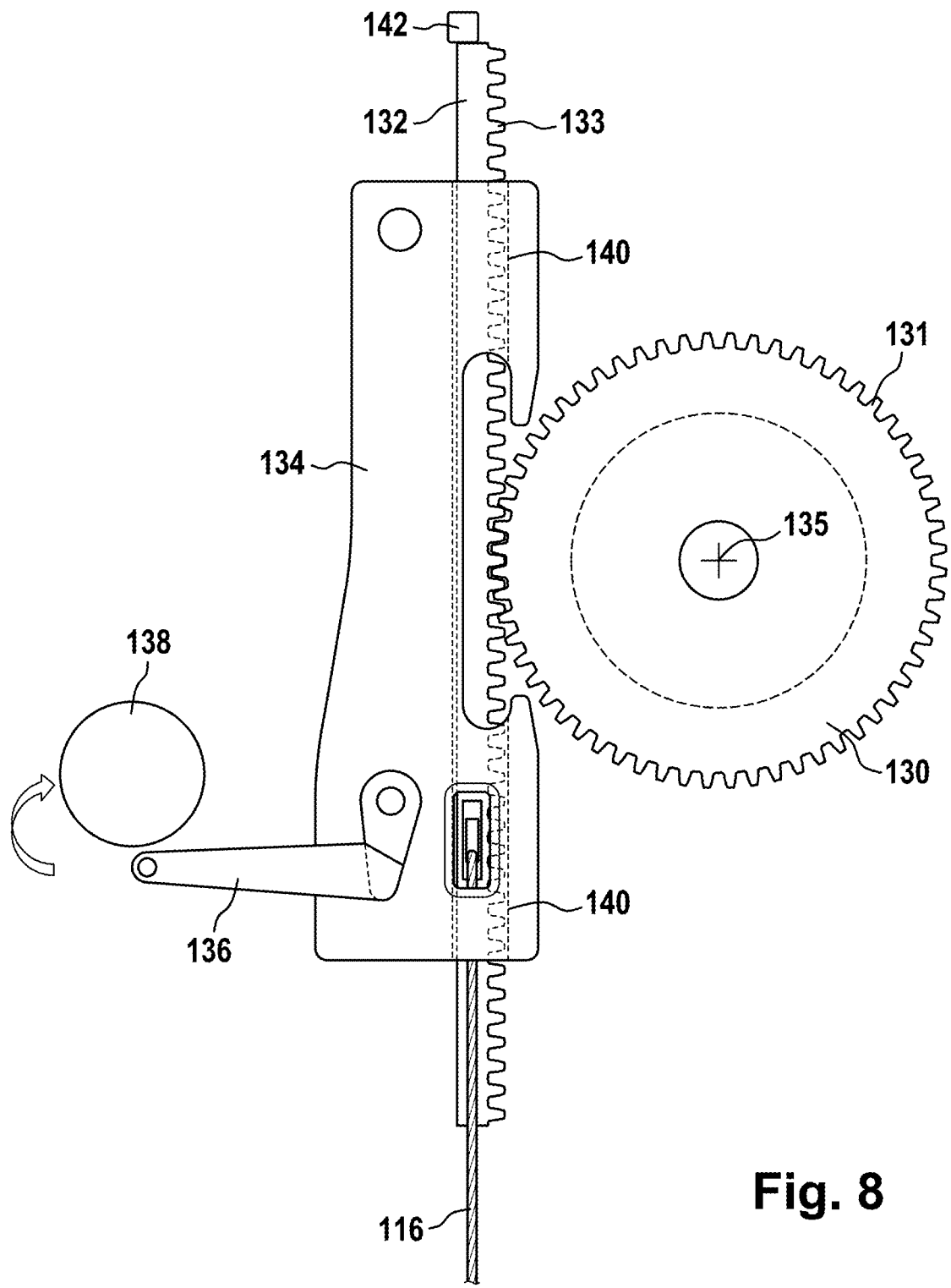
FIG. 8 shows an exemplary decoupling mechanism.

FIG. 8 shows a schematic drawing of a decoupling mechanism adapted for decoupling a force-transmitting element 116 from a motion element 130. The motion element 130 may, for example, comprise a gear wheel rotatable around a rotational axis 135. For example, the gear wheel 130 may be rigidly connected with a seat element or a supporting base of the child safety seat. A second toothed element in FIG. 8 is in the form of a rack 132 with teeth 133 engaged with teeth 131 of the gear wheel 130 may be provided by the supporting base or the seat element, respectively. Changing the orientation of the seat element from an entry position to a driving position may result in a rotation of the gear wheel 130 relative to the rack 132. The rack 132 is coupled with the force-transmitting element 116, for example, provided by a pull cable, and may pull the pull cable 116. A decoupling mechanism is provided for decoupling the force-transmitting element 116 from the motion element 130 by disengaging the rack 132 from the gear wheel 130. The decoupling mechanism may comprise a lever 136. The lever 136 may, for example, be implemented in the form of a toggle lever configured for pulling away a supporting plate 134 from the gear wheel 130. The supporting plate 134 may comprise a guiding rail 140 for guiding the rack 132. The lever 136 may, for example, be moved in order to disengage the rack 132 from the gear wheel 130 by an electromechanical actuator 138 or a mechanical force guidance coupled to the rotation of the gear wheel. Thus, the decoupling may be triggered by the gear wheel 130 reaching a designated end position, which may coincide with the driving position of the seat element. The reaching of the designated end position may, for example, be detected by a sensor element 142. The sensor element 142 may comprise a push-button switch or an optical switch. The sensor element 142 may send a sensor signal indicating the reaching of the driving position. The reaching of the driving position may be determined directly, based on monitoring the relative position of the seat element to the supporting base or indirectly by detecting the rack 132 reaching a position corresponding to the seat element reaching the driving position.

The signal may be received by a control unit (not shown) controlling the electromechanical actuator 138 to move the lever 136 using a control signal. The electromechanical actuator 138 may, for example, comprise an electric drive. Alternatively, the sensor element 142 may send the sensor signal directly to the electromechanical actuator 138. The sensor signal may control or trigger the electromechanical actuator 138 to move the lever 136. Alternatively, a mechanical forced guidance coupled to the rotation may be implemented, for example, a pull cable.

Figure 9:
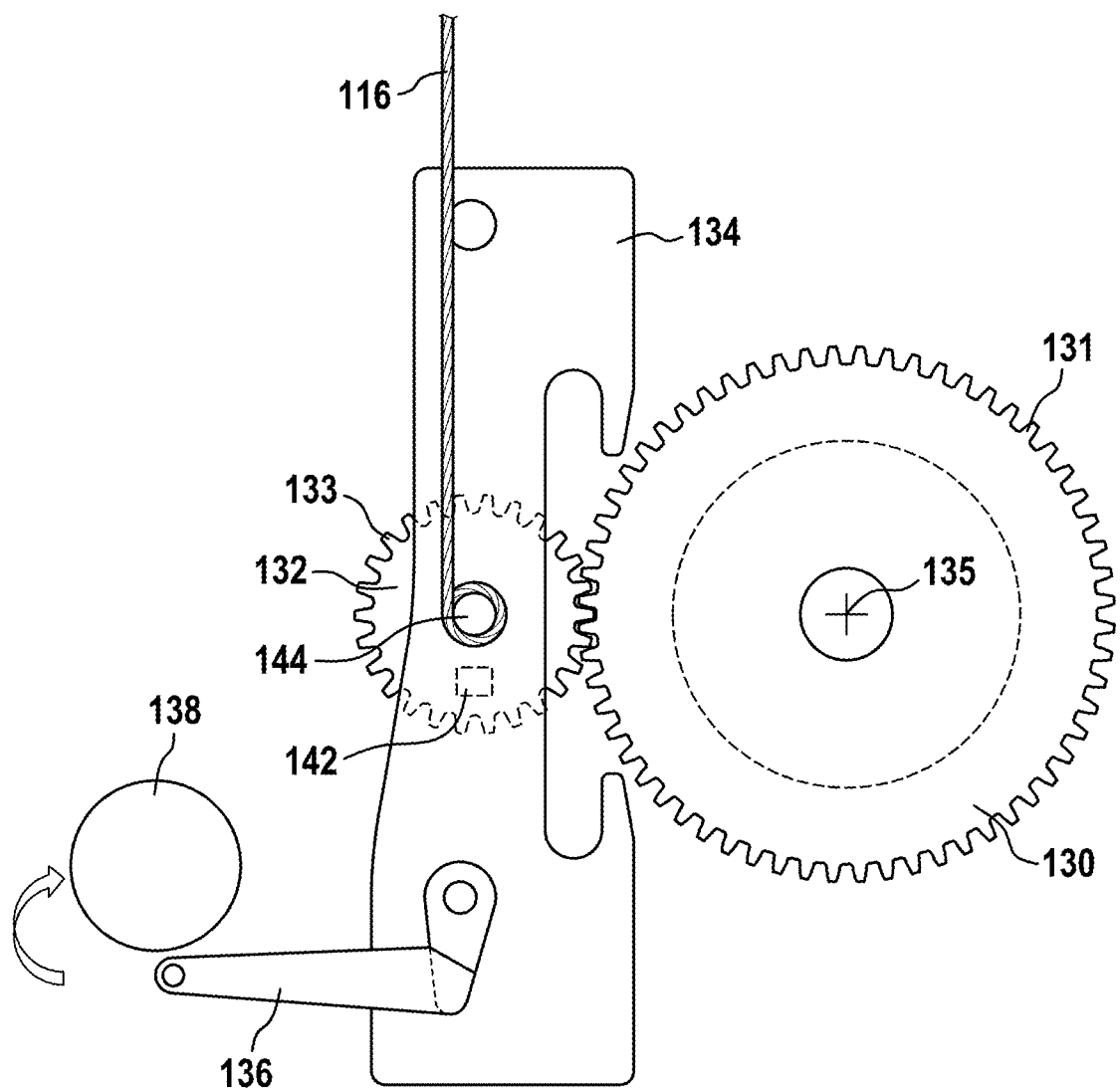
FIG. 9 shows a further exemplary decoupling mechanism.

FIG. 9 shows a schematic drawing of an alternative implementation of the second toothed element of FIG. 8. In the case of FIG. 9, the second toothed element is implemented in the form of a gear wheel 132 configured for a rotation around rotational axis 144. The gear wheel 132 may comprise a smaller diameter than the gear wheel 130. For example, the gear wheel 132 may be configured to roll up a force-transmitting element 116 in the form of a pull cable. A sensor element 142 may monitor an orientation of the gear wheel 132 and/or detect a reaching of an orientation of the gear wheel 142 corresponding to a driving position of the seat element.

Figure 10:
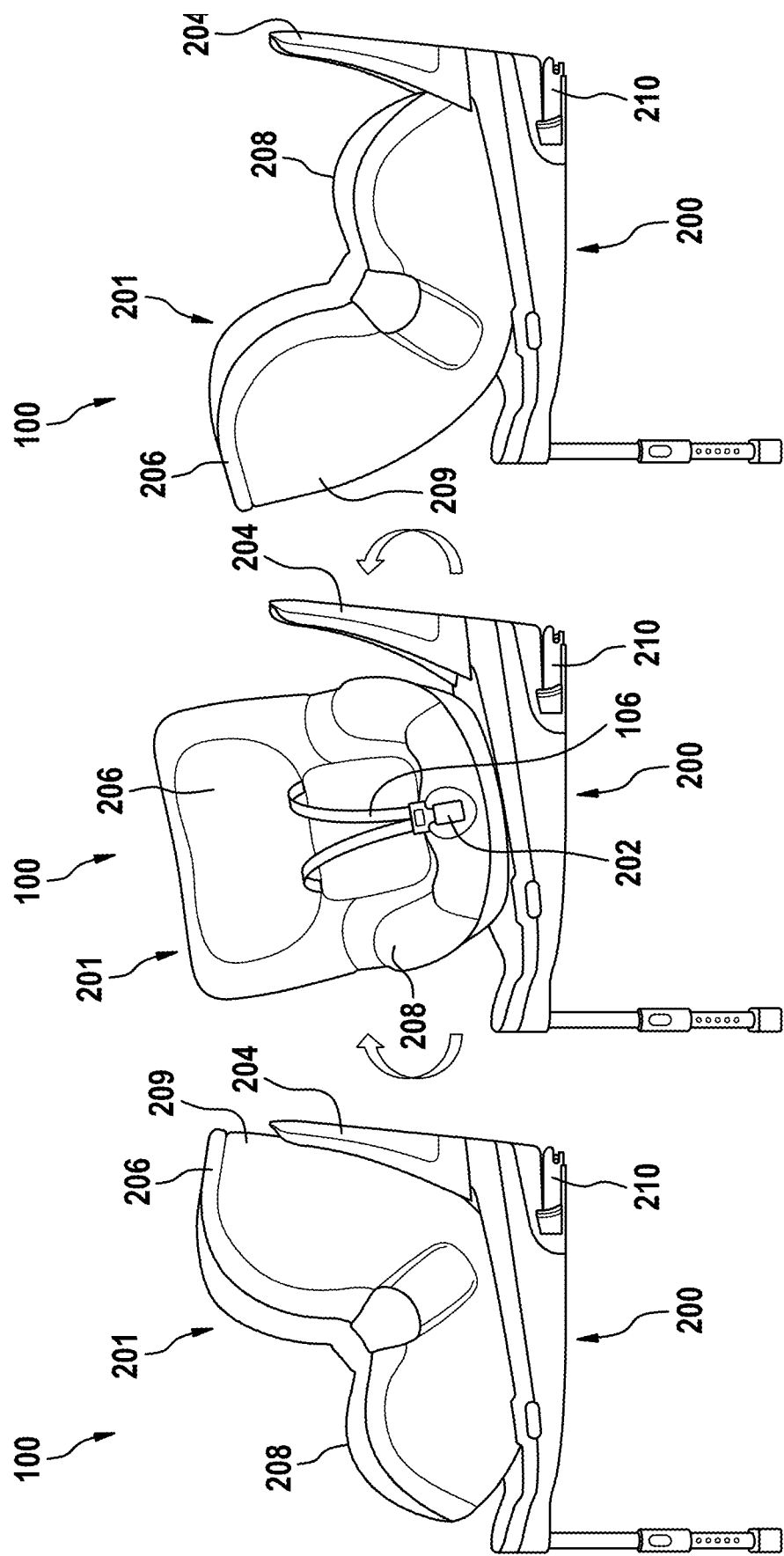
FIG. 10 shows orientations of an exemplary child safety seat comprising a horizontally rotatable seat element.

FIG. 10 shows a schematic drawing of first, second and third exemplary orientations of a child safety seat 100. The child safety seat 100 comprises a seat element 201 that is pivot-mounted on a supporting base 200. The child safety seat 100 may further comprise, without limitation, one or more of the following: a buckle 202 or equivalent counterpart for fastening a tongue or equivalent means of the integral harness belt 106; a force-limiting means for limiting the harness belt tension upon fastening with the buckle 202 to a predetermined maximum force; armrests 208; a headrest; a backrest 206; one or more connectors 210 for establishing a positive connection with the frame of a vehicle; a seat shell 209; a rebound bar 204 adapted for being fixed rigidly to the child safety seat 100 and for forming an abutment with respect to a vehicle seat on which the child safety seat 100 is to be installed; and one or more joints, axes, pivots or other means allowing for a vertical and/or horizontal rotation of one or more elements of the seat element 201 relative to a supporting base 200 or a vehicle seat on which the child safety seat 100 is to be installed.

On the left-hand side, the seat element 201 and supporting base 200 are shown in the second relative orientation, which permits the child located in the seat 100 to face the forward direction of a vehicle seat (not shown) receiving the child safety seat 100 with the seat element 201 mounted on the supporting base 200. In the centre of the drawing, the seat element 201 and supporting base 200 are shown in the first relative orientation, which permits the child located in the seat element 201 to face the left side of the vehicle seat relative to said forward direction of the vehicle seat. This orientation, i.e., the entry position, provides an easy entry for laterally positioning the child in the child safety seat 100. On the right-hand side, the seat element 201 and supporting base 200 are shown in the third relative orientation, i.e., the driving position, which permits the child to be located in the seat element 201 facing the backrest of the vehicle seat, i.e., opposite said forward direction of the vehicle seat.

The three orientations may be transformed from one to another by horizontal rotation of the seat element 201 relative to the supporting base 200, as indicated by bent arrows between the first and second orientations and, respectively, between the first and third orientations. The child safety seat 100 may comprise a mechanism, for example, a gearing mechanism, a Bowden cable or the like, (as seen in FIGS. 8 and 9) for transforming rotational energy originating from the horizontal rotation of the seat element 201 between the first and second orientations or, respectively, between the first and third orientations, into elastic energy, and for storage of the transformed energy as elastic energy in an elastic mechanism. The elastic energy stored in the elastic mechanism may be released upon receipt of a trigger signal forcing a deflector from a first to a second position, resulting in an increased tension of the harness belt 106.

Figure 11:
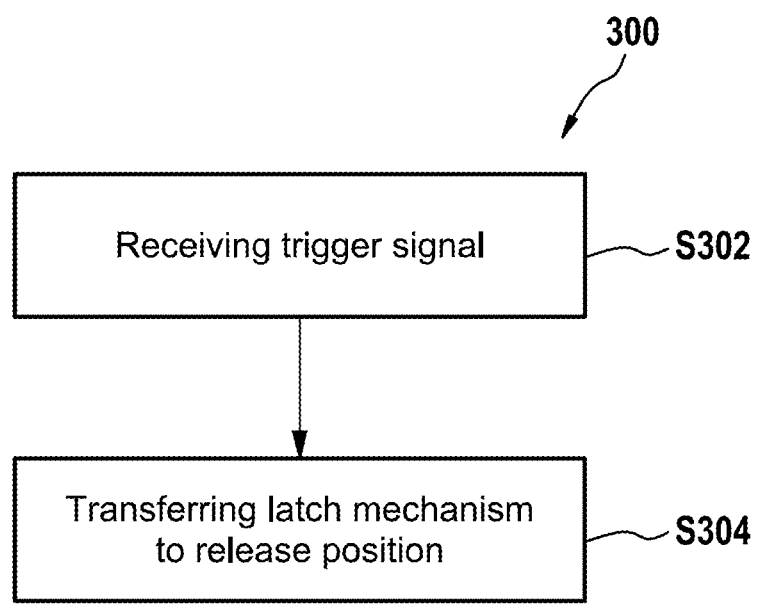
FIG. 11 shows a flow diagram illustrating steps of an exemplary method of operating a child safety seat.

FIG. 11 shows a flow diagram illustrating steps of an exemplary method 300 of operating a child safety seat. The child safety seat comprises an integral harness belt for restraining a child in the child safety seat, a deflector for the harness belt and an elastic mechanism adapted for forcing the deflector from a first position to a second position. The harness belt is guided by the deflector. Due to the guidance by the deflector, the harness belt length available for buckling in the child is shorter in the second position than in the first position. The child safety seat further comprises a latch mechanism transferable between a blocking position and a release position. The latch mechanism is adapted for blocking (in the blocking position) the deflector against a movement toward the second position and for releasing (in the release position) the deflector for a movement induced by the forcing toward the second position. A release mechanism of the child safety seat is adapted for transferring the latch mechanism from the blocking position to the release position upon receiving a trigger signal.

The deflector is located in the first position and the latch mechanism is arranged in the blocking position. In step 302, the release mechanism receives the trigger signal. In step 304, the release mechanism in response to receiving the trigger signal transfers the latch mechanism from the blocking position to the release position.

Thus, the deflector is no longer blocked against a movement toward the second position and the elastic mechanism forces the deflector from a first position to a second position. Because of the deflector's movement into the second position, the harness belt length available for buckling in the child is shortened. By shortening the harness belt length available for buckling, i.e., by tightening the integral harness belt, any slack of the integral harness belt may be reduced, and thus a tight coupling of the child seated in the child safety seat to the inertial frame of the vehicle may be provided, for example, in case of a strong acceleration/deceleration. In this way, the exposure of the child to peak forces may be reduced or minimized, protecting the child.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A child safety seat comprising:
   an integral harness belt for restraining a child in the child safety seat,
   a deflector for the harness belt,
   an elastic mechanism adapted for forcing the deflector from a first position to a second position, the harness belt being guided by the deflector, wherein due to the guidance by the deflector the harness belt length available for buckling in the child is shorter in the second position than in the first position,
   a latch mechanism transferable between a blocking position and a release position, the latch mechanism being adapted for blocking in the blocking position the deflector against a movement toward the second position and for releasing in the release position the deflector for a movement induced by the forcing towards the second position,
   a release mechanism adapted for transferring the latch mechanism from the blocking position to the release position upon receiving a trigger signal, and
   a force-transmitting element coupled to a motion element, the force-transmitting element being adapted for transmitting a motion force from the motion element to the deflector that acts to force the deflector from the second position to the first position.

2. The child safety seat of claim 1, the latch mechanism comprising a first toothed element and a pawl, the deflector being coupled to the first toothed element, the latch mechanism being transferable between the blocking position and the release position by an engagement and a disengagement of the pawl with the first toothed element.

3. The child safety seat of claim 2, the first toothed element and the pawl forming a ratchet and/or the first toothed element comprising multiple teeth with the pawl being adapted for performing the engagement with one of the teeth.

4. The child safety seat of claim 1, the release mechanism comprising a drive, the drive being coupled to the latch mechanism.

5. The child safety seat of claim 4, wherein the latch mechanism includes a first toothed element and a pawl, the drive being coupled to the pawl by a first coupling, optionally the drive being adapted for rotating the pawl using the first coupling via a lever arm of the pawl around an axis between different rotational positions, the engagement and disengagement of the pawl with the first toothed element being caused by the different rotational positions of the pawl.

6. The child safety seat of claim 1, wherein the deflector being arranged on an arm rotatable about a first axis, the child safety seat further comprising a rolling element coupled to the force-transmitting element and mounted eccentrically about a second axis, the rolling element being adapted to roll on the arm during a rotation of the rolling element about the second axis, the rotation being due to the motion force, the deflector being transferable from the second position to the first position due to the rolling.

7. The child safety seat of claim 6, the rolling element and the arm being shaped in such a manner that with exceeding a predefined rotation orientation of the rolling element the arm is freely rotatable around the first axis for the transfer of the deflector from the first position to the second position, wherein preferably the deflector is transferable from the second position to the first position due to the rotation of the rolling element in a rotation direction from a starting rolling orientation to an end rolling orientation, the predefined rotation orientation resulting from a continuation of the rotational movement in the direction of movement beyond the end rolling orientation.

8. The child safety seat of claim 1, further comprising a decoupling mechanism adapted for automatically force decoupling the force- transmitting element from the motion element upon the deflector having reached the first position, wherein optionally the decoupling mechanism is further adapted for automatically recoupling the force-transmitting element to the motion element upon the deflector having reached the second position.

9. The child safety seat of claim 8, wherein the motion element comprises one of:
a movable lever arranged outside a seat shell of the child safety seat, wherein optionally the child safety seat further comprises a rebound bar, the rebound bar being adapted for being fixed rigidly to the seat and for forming an abutment with respect to the vehicle seat on which the child safety seat is to be installed, the lever being given by the rebound bar, a portion of the harness belt, or a drive shaft of a motor.

10. The child safety seat of claim 8, further comprising a supporting base and a seat element, the seat element providing a seating for the child in the seat, the seat element being mounted rotatably relative to the supporting base, the motion force resulting from the rotation of the seat element relative to the supporting base.

11. The child safety seat of claim 10, the seat element being horizontally rotatable between an entry position and a driving position, wherein the entry position and the driving position differ by at least an angle of rotation of 45 degrees, preferably at least 80 degrees, the motion force resulting from the rotation of the seat element relative to the supporting base between the entry position and the driving position, wherein the decoupling mechanism being adapted for performing the force decoupling of the force-transmitting element from the motion element upon the seat element having reached the driving position.

12. The child safety seat of claim 11, the decoupling mechanism being adapted for performing the force decoupling by disengaging the second toothed element from the gear wheel, wherein optionally the decoupling mechanism comprises for performing the force decoupling anyone of an electromechanical actuator and a mechanical forced guidance coupled to the rotation of the seat element, or the decoupling mechanism further comprising a control unit, the control unit being adapted for controlling the electromechanical actuator for engaging the second toothed element with the gear wheel in response to the deflector having taken the second position.

13. The child safety seat of claim 10, the motion element being arranged at a rigid position on the supporting base, wherein the force-transmitting element comprising a transmission shaft, the supporting base comprising the motion element.

14. The child safety seat of claim 10, the force-transmitting element comprising a second toothed element, the motion element comprising a gear wheel adapted for meshing with the second toothed element and for transmitting a torque resulting from the rotation of the seat element to the second toothed element.

15. A method of operating a child safety seat comprising:
an integral harness belt for restraining a child in the child safety seat,
a deflector for the harness belt,
an elastic mechanism adapted for forcing the deflector from a first position to a second position, the harness belt being guided by the deflector, wherein due to the guidance by the deflector the harness belt length available for buckling in the child is shorter in the second position than in the first position,
a latch mechanism transferable between a blocking position and a release position, the latch mechanism being adapted for blocking in the blocking position the deflector against a movement toward the second position and for releasing in the release position the deflector for a movement induced by the forcing towards the second position,
a release mechanism adapted for transferring the latch mechanism from the blocking position to the release position upon receiving a trigger signal,
a force-transmitting element coupled to a motion element, the force-transmitting element being adapted for transmitting a motion force from the motion element to the deflector that acts to force the deflector from the second position to the first position
the method comprising:
receiving the trigger signal,
transferring the latch mechanism to the release position.

16. A system of operating a child safety seat comprising:
the child safety seat including:
an integral harness belt for restraining a child in the child safety seat,
a deflector for the harness belt,
an elastic mechanism adapted for forcing the deflector from a first position to a second position, the harness belt being guided by the deflector, wherein due to the guidance by the deflector the harness belt length available for buckling in the child is shorter in the second position than in the first position, a latch mechanism transferable between a blocking position and a release position, the latch mechanism being adapted for blocking in the blocking position the deflector against a movement toward the second position and for releasing in the release position the deflector for a movement induced by the forcing towards the second position, a release mechanism adapted for transferring the latch mechanism from the blocking position to the release position upon receiving a trigger signal, a force-transmitting element coupled to a motion element, the force-transmitting element being adapted for transmitting a motion force from the motion element to the deflector that acts to force the deflector from the second position to the first position; and a non-transitory, computer-readable medium storing instructions, which when executed by a processor, cause the processor to:

receive the trigger signal, and transfer the latch mechanism to the release position.

\* \* \* \* \*